May 11, 1965 E. J. BECKER ETAL 3,183,396
METHOD OF MANUFACTURING SINTERED CATHODE
Filed May 21, 1962

○ POROUS TUNGSTEN MATRIX – 3100 HOURS
× CONTROL – MATRIX – 5% ZrH – NO FILM – 200 HOURS
● CONTROL – MATRIX – 5% ZrH – NO FILM – 1500 HOURS
■ MATRIX – Ni FILM – 5% ZrH – 1500 HOURS
□ MATRIX – Ni FILM – 5% ZrH – 3100 HOURS

INVENTORS E. J. BECKER
D. E. KOONTZ
D. W. MAURER
BY Edward M. Fink
ATTORNEY

United States Patent Office 3,183,396
Patented May 11, 1965

3,183,396
METHOD OF MANUFACTURING SINTERED CATHODE
Edward J. Becker, North Plainfield, Donald E. Koontz, Summit, and Dean W. Maurer, Berkeley Heights, N.J., assignors to Bell Telephone Laboratories, Incorporated, New York, N.Y., a corporation of New York
Filed May 21, 1962, Ser. No. 196,261
5 Claims. (Cl. 313—355)

This invention relates to a method for the fabrication of cathode elements destined for use in thermionic tubes and to the elements so produced.

In recent years the matrix or molded cathode has gained popularity in the electronics industry. Typical of such devices is that described and claimed in U. S. Patent 2,543,439 wherein exemplary cathodes are prepared by mixing nickel powder with barium and strontium carbonates, molding the resultant mixture under pressure and firing. Although such devices showed some promise as compared with the more conventional type of sprayed cathode element, thermionic tubes utilizing such elements have not found widespread commercial acceptance.

There is herein described and claimed a novel matrix cathode of the type described in the U.S. patent alluded to above. Briefly, the cathode element comprises a graded sintered matrix having three regions. The first or bottom region includes nickel together with an activator material, typically zirconium hydride or an alloy of nickel and the activator material, i.e., nickel-zirconium. The second or intermediate layer includes nickel, at least one alkaline earth carbonate and, optionally, an activator material, or an alloy as noted above. The third or upper region comprises a thin film of at least one of the metals nickel, cobalt, molybdenum and tungsten.

The preparative technique involves mixing nickel powder with an activator material and pressing it lightly, mixing nickel powder with an alkaline earth carbonate and optionally an activating agent and pressing it lightly atop the prior mixture, molding the two mixtures under pressure into the desired shape, firing the molded element and coating it with a thin film of metal. The coated element is then refired to convert the carbonates to their corresponding oxides.

The resultant matrix may then be stored until ready for use at which time it is inserted into a tube envelope and heated in vacuo, thereby causing diffusion of free alkaline earth metal through the metal film to the surface where it is oxidized.

The cathode elements so produced are advantageous in several respects. Initially, it is noted that the conventional binders are not employed, which tend to impede diffusion welding and ultimately result in sacrifices in mechanical stability and which form gaseous products. The presence of the third or uppermost region is particularly noteworthy in that it provides protection against chemical damage and permits more rigorous outgassing prior to assembly than heretofore attained. More simply, it may be stated that the thin film is a thermally activated gate which permits conversion of the carbonates to the oxides prior to assembly.

Examination of the properties of such elements indicates the attainment of high current densities, of the order of 9 amperes/cm.$^2$, avoidance of blooming and extension of life, all of which may be attributed to the fact that the oxides are protected from ambient gases during assembly and outgassing of the tube and are physically separated from reducing agents.

The invention will be more easily understood from the following detailed description taken in conjunction with the accompanying drawing wherein.

Figure 1:
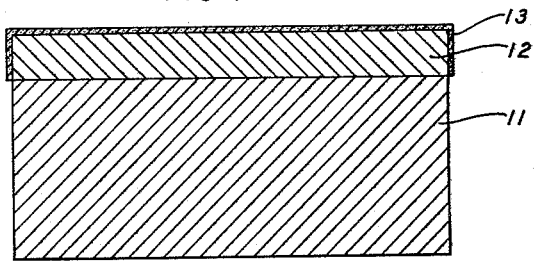
FIG. 1 is a cross-sectional view of the novel cathode of this invention.
Figure 2:
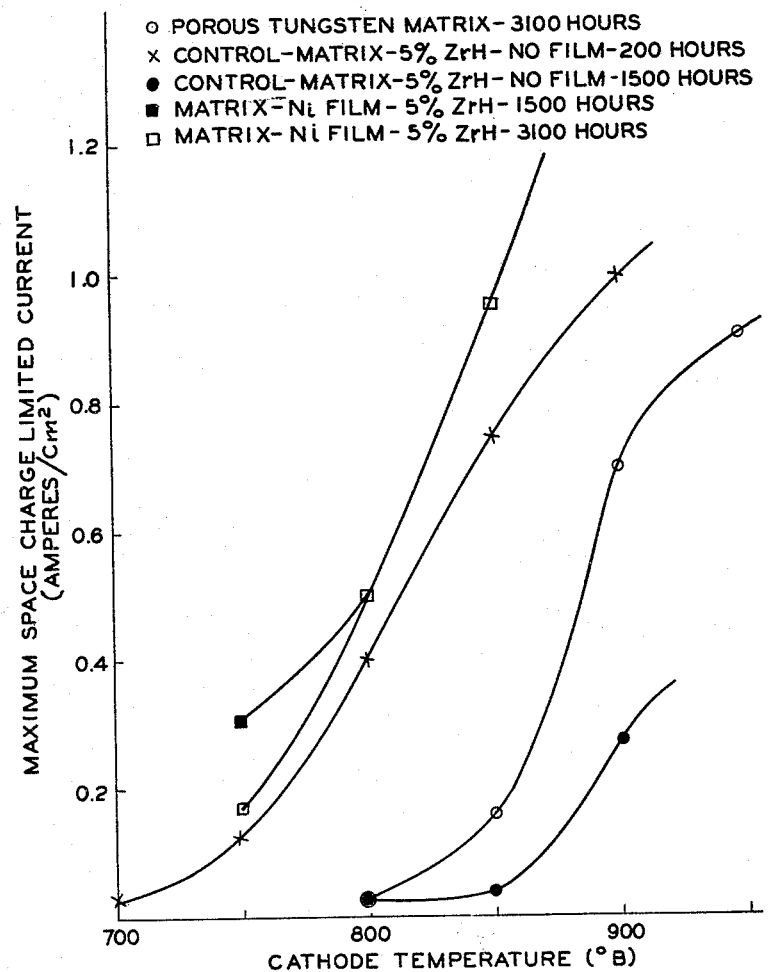
FIG. 2 is a graphical representation on coordinates of maximum space charge limited current in amperes/cm.$^2$ against cathode temperature in degrees brightness showing a comparison of prior art cathodes with those of the present invention after the indicated time periods.

A general outline of the procedure employed in fabricating the novel elements together with the ranges of operating parameters will now be given.

An initial emitting mixture is prepared. This mixture contains nickel powder, an emitting material such as coprecipitated barium-strontium carbonate and, optionally, an activating agent. The grade of nickel powder chosen should be as nearly pure as practical (99.9% pure), particularly free of oxides and binders, so as not to contain any contaminant which might impair the emitting characteristics of the final structure and to assure intimate contact between individual metallic particles during the subsequent diffusion welding at low pressures and temperatures. Carbonyl derived nickel powder has been found suitable for this purpose.

Any of the powdered emitting mixtures well known in the preparation of sprayed and molded cathodes may be employed. These materials contain a barium compound which will be converted to barium oxide in a vacuum or by some other means, as for example, in a hydrogen atmosphere. Typically, this compound is a carbonate. Such materials include the single carbonate material, barium carbonate; the double carbonate material, coprecipitated barium-strontium carbonate; and the triple carbonate, coprecipitated barium-strontium-calcium carbonate. In addition, a mechanical mixture of any of these materials is suitable. The most commonly available material for this purpose is a coprecipitant of equimolar portions of barium carbonate and strontium carbonate.

The emitting mixture is prepared by milling a thermionic grade carbonate of the desired type by mechanical mixing with nickel shot in a rotary mill after which the mixture is stored in a dry glass stoppered bottle until ready for use.

Activators which perform the function of producing the emission characteristics of the structure are well known in the cathode art and reference may be had to the literature as to available activator materials. Such activators include compounds of zirconium, magnesium, etc.

The following is an outline of the procedure to be followed in producing a cathode element from the above materials.

To the nickel powder there is added typically from 1 to 5 percent by weight of an activator material. The mixture of nickel powder and activator is thoroughly dry mixed as, for example, in a ball mill. This mixture is herein referred to as the nickel mix and may be stored until required. Alternatively, an alloy comprising nickel and an activator may be employed, for example, nickel-zirconium alloy.

A second basic mixture is now prepared by mixing a single, double or triple carbonate with from 0 to 5 percent by weight of an activator material, the amount of carbonate being in the range of 10 to 30 percent by weight of the mixture, remainder nickel. Mixing is conducted in a ball mill. This mixture is herein referred to as the emitting mixture.

The nickel mix and the emitting mix having been prepared, the next step in the process is to press the materials into the desired shape and size. The first step in the pressing technique is to insert a layer of emitting mix into a die and subject it to hand pressing with a flat faced plunger. The plunger is now removed and the nicked mix inserted atop the hand pressed mixture. The former is then slightly vibrated in order to compact the two layers and then hand pressed with a flat plunger. The die is then turned over and the flat plunger contacting the emitting mixture is replaced with a plunger of any desired shape. It is noteworthy that a matrix of any desired shape may be prepared by the use of particular plungers in pressing. Thus, by the use of a curved plunger there results a cathode element which is concave in nature, such elements being of particular interest for use in convergence type guns.

The entirety comprising the two mixes is then pressed at a pressure within the range of from 10 to 100 tons per square inch, such pressures being readily available on commercial hydraulic presses.

Following pressing, the resultant assembly is subjected to heat treatment, the chief purposes of which are to sinter the nickel so as to produce a mechanically rigid body, decompose the activator compound and diffuse the activator into the nickel to protect the activator from oxidation during later stages. This treatment, termed firing, must be carefully controlled in order to avoid undue oxidation of the nickel and activator and conversion of the alkaline earth carbonates to the oxides which will react further with the impurities in the atmosphere to produce hydroxides.

The pressed structure is next placed in a boat constructed of a noncontaminating material such as Driver Harris No. 499 nickel, which is a high purity passive nickel. The boat is inserted in a suitable furnace such as a one and one-half inch diameter electric globar furnace which is maintained at room temperature and purged with an inert gas such as purified dry nitrogen containing less than 0.1 percent of impurities. Any inert gas such as helium or argon may be substituted for the nitrogen providing its impurity content is not undesirable.

Following the purge, the furnace is put into operation and with pure dry nitrogen flowing is heated from room temperature to about 600° C. at a rate typically of the order of 40° C. per minute. The purpose of the nitrogen flow is to prevent any substantial oxidation of the nickel or the activator particles in the mixture. When the temperature of the furnace reaches 600° C. it is held there for about 15 minutes after which the power is turned off and the furnace permitted to cool to room temperature. Nitrogen flow is maintained during both the 600° C. heating step and the cooling step.

The nickel boat is now removed from the furnace, the sintered cathode element extracted, inserted in a die and repressed at a pressure within the range of 10 to 100 tons per square inch in order to compensate for shrinkage occurring during the firing step.

Next, the cathode element is expelled from the die and inserted in a vacuum chamber as, for example, a bell jar, wherein the humidity and concentration of reactive gases are carefully regulated. The chamber is then evacuated and a thin film of a noncontaminating metal such as nickel, molybdenum, cobalt or tungsten is deposited on the cathode element so as to completely overlap the region containing the emitting mixture, by vacuum evaporation, cathodic sputtering, or vapor plating in a manner well known in the art (see "Vacuum Deposition of Thin Films," L. Holland, J. Wylie and Sons, Inc., New York, 1956). The thickness of the deposited film is at least 500 A., such thickness being required in order to protect the cathode from corrosion and subsequent degradation with loss of active material by reaction with active gases in the atmosphere during the process of assembling the cathode in the tube structure. There is no absolute maximum on the thickness of the nickel layer; however, films appreciably thicker than 2000 A. delay the time period required for diffusion of free barium therethrough to the surface, such diffusion being an ultimate goal.

The coated structure is now returned to the boat which is again inserted in the furnace. The furnace which is maintained at room temperature is purged with an inert gas such as purified dry nitrogen or hydrogen and heated to 600° C. as before. When the temperature of the furnace reaches 600° C. the gas flow is changed to purified dry hydrogen or prepurified hydrogen. The temperature of the furnace is again caused to rise, this time to a temperature of approximately 1000° C. at a rate within the range of 10 to 15 degrees per minute. When the furnace temperature reaches 1000° C. it is maintained for a time period of approximately 10 to 15 minutes upon the expiration of which the power is turned off and the furnace permitted to cool to about 600° C. with hydrogen still flowing. During this last heating cycle the carbonates are converted to their corresponding oxides.

When the furnace has cooled to about 600° C., the hydrogen flow is stopped and nitrogen is caused to flow through the furnace. In general, the cooling rate is not critical providing that the rate is not such as to produce serious thermal stress and resultant cracking of the cathode. When the furnace is at room temperature the flow of nitrogen is stopped. If desired, there is no objection to substituting hydrogen for nitrogen in the cooling range between room temperature and 600° C.

The sintered cathode element may now be machined if such is desired, although it is preferred to machine prior to depositing the metal film, after which it may either be placed directly in the vacuum tube structure or may be stored until required. It is noteworthy that the resultant sintered cathode need not be stored in vacuo as required in the case of a typical prior art cathode, the nickel film providing a suitable detergent to degradation of the cathode surfaces.

All that remains in the manufacture of a usable cathode is to assemble the element in a tube envelope. Since this procedure is well known to those skilled in the art, it will not be described in detail. In brief, the procedure consists of sealing the element on a vacuum station which is evacuated to a pressure of the order of $10^{-7}$ millimeters of mercury and baked out for approximately 16 hours at 400° C. The cathode is then heated to a temperature within the range of 1050 to 1075° C. and held at this temperature for about five minutes. The adjacent tube elements are then heated to a temperature of about 700° C. to outgas the tube which is then sealed, so completing the fabrication of the thermionic tube.

While the technique has been described in specific terms as applied to the coating step, it will be appreciated that the processing steps are more exemplary and other procedures as described in U.S. Patents 2,543,439 and 2,899,299 may be employed.

FIG. 1 is a cross-sectional view of a cathode prepared in accordance with this invention. Shown in the figure is a first or lower region 11 including nickel together with an activator, a second region 12 including nickel, barium-strontium oxides and an activator and a third region 13 comprising a thin film of nickel or other coating as discussed.

In order that those skilled in the art may more fully understand the inventive concept herein presented, the following example is given by way of illustration and not limitation.

*Example*

0.0375 gram of zirconium hydride powder was added to 0.7125 gram of carbonyl derived nickel having a chemical purity of 99.9 percent by weight. The combined powders were thoroughly mixed in a ball mill. This material will be referred to as the "nickel mix."

The emitting mix was formed by dry mixing 0.0015 gram of zirconium hydride, 0.0300 gram of alkaline earth double carbonate (coprecipitated barium-strontium carbonate) and 0.1185 gram of carbonyl derived nickel in a ball mill.

A three-piece, double-acting die of circular cross-section having an 0.411 inch inside diameter hole and two sliding plungers was used to mold the nickel mix and emitting mix into a pressed composite body as follows:

A layer of emitting mix was inserted into the die and subjected to hand pressing with a flat faced plunger. The plunger was then removed and the nickel mix inserted atop the hand pressed emitting mixture. The two mixtures were then subjected to gentle vibration in order to form a smooth compacted mixture. Next, the flat faced plunger was used to press the two mixtures. The die was then turned over and the flat plunger contacting the emitting mixture was replaced with a curved plunger. The plungers were then centered in the die body, the complete assembly was placed in a hydraulic press and a pressure of 10 tons per square inch was applied. The plunger and pressed disk were then ejected from the die body.

The pressed disk was then placed in a nickel boat and the boat was inserted in a globar furnace having a one and one-half inch inside diameter. With the furnace at room temperature nitrogen was caused to pass through the system, such nitrogen being pure dry nitrogen containing no more than 0.1 percent impurities, at a flow rate of 2 liters per minute for 5 minutes.

The furnace was then switched on and allowed to heat at the rate of 40° C. per minute to a temperature of 600° C. With nitrogen flowing through, the furnace was maintained at 600° C. for 15 minutes at which time the power was turned off and the furnace permitted to cool to room temperature, cooling being attained in 30 minutes. The sintered cathode element was next inserted in the die utilized previously, the plungers centered in the die body and the complete assembly placed in a hydraulic press and a pressure of 50 tons per square inch was applied between the plungers. The repressed element was then ejected from the die body.

The cathode element was next placed in a vacuum chamber containing a tungsten filament and a platform which was employed as a positioning support for the element, the space from filament to element being approximately 3½ inches. A two inch piece of highly purified nickel wire, 30 mils in diameter was placed within the tungsten filament. The vacuum chamber was evacuated to a pressure of approximately 0.01 micron Hg. Current was caused to flow through the tungsten filament, heating it to incandescence and thereby heating the nickel wire and causing it to evaporate. After 30 minutes a layer of nickel 1000 A. thick was produced on the cathode element.

Following the deposition of the nickel layer, the cathode was again placed in the nickel boat which was inserted in the globar furnace. The nitrogen purging and heating step previously performed was repeated until a temperature of 600° C. was reached. The flow of nitrogen gas was then replaced by a one liter per minute flow of pure dry hydrogen and the furnace permitted to heat to 1000° C. at a rate of 15° C. per minute. When the furnace temperature reached 1000° C. it was held there, with hydrogen flowing, for 15 minutes. Then the power was turned off and the furnace was permitted to cool to 600° C. at which time hydrogen flow was replaced by pure dry nitrogen at the flow rate set forth above. The cooling program was continued until room temperature was reached. The boat was then removed from the furnace and the cathode element stored until ready for assembly in a tube envelope.

When ready for use, the cathode element so produced was assembled in a tube envelope by conventional techniques and sealed to a vacuum system in which a vacuum of $10^{-7}$ millimeters of mercury was maintained and in which the structure was baked for 16 hours at 400° C. After bake-out cathode heater voltage was applied to increase the cathode temperature to 1050° C. at which it was maintained for 5 minutes. Next, voltage was applied to the anode until a cathode current of 1 amp/cm.$^2$ was attained. The tube was then sealed off the station. The completed tube was then placed on a life test rack and its operating characteristics observed.

The full impact of the present invention can best be seen by reference to the figure wherein a direct comparison of operating characteristics is made between prior art cathodes and those fabricated in accordance with the present inventive technique.

The data reflected in the figure was obtained in accordance with the following procedure.

Three matrix cathodes were prepared in accordance with the technique described above; however, only two of such cathodes contained a 1000 A. layer of evaporated nickel, the third being employed as a control. In order to provide a direct comparison between applicants' matrix cathode and those of the prior art, a porous tungsten matrix impregnated with barium aluminate was subjected to similar treatments.

The four tubes were put on a lift test rack and 450 volts D.-C. applied to the anode, and after the noted periods of time the D.-C. current of each was measured as a function of the anode voltage at a given temperature. The data obtained was then plotted on a graph having current to the two-thirds power as one coordinate and voltage as the other coordinate. The resultant curves initially were straight lines but at some point began to deviate. These points were then plotted as a function of temperature, so resulting in the curves set forth in the figure.

It is noted that in the early stages of life the curve of the control tube processed without a nickel coating gradually deviates from a straight line path after only 200 hours on life tests, so indicating a relatively nonuniform emission over the face of the control cathode. The most striking differences appear later in the life of the cathode; specifically, it is seen that after 1500 hours the curve of the control tube evidences little or no straight line section as compared with the nickel matrix cathode after 1500 and even 3100 hours of life test.

The cathodes of the present invention may also be compared favorably with the conventional porous tungsten matrix impregnated with barium aluminate. The most significant fact noted from the figure is the necessity of increasing the operating temperature to greater than 900° C. in order to attain satisfactory current densities.

While the invention has been described in detail in the foregoing specification and the drawing similarly illustrates the same, the aforesaid is by way of illustration only and is not restrictive in character. The several modifications which will readily suggest themselves to persons skilled in the art are all considered within the scope of this invention, reference being had to the appended claims.

What is claimed is:

1. A cathode element destined for use in a thermionic tube comprising a sintered matrix having three regions, the first region consisting essentially of one member selected from the group consisting of (a) nickel and an activator material, and (b) an alloy of nickel and an activator material; the second region comprising nickel and at least one alkaline earth oxide, and the third region consisting essentially of a thin film of at least one metal selected from the group consisting of nickel, molybdenum, tungsten and cobalt, said third region overlapping the entirety of said second region.

2. A cathode element in accordance with claim 1 wherein said first region consists essentially of nickel and zirconium hydride.

3. A cathode element in accordance with claim 1 wherein said second region comprises nickel, barium-strontium carbonate and an activator material.

4. A cathode element in accordance with claim 1 wherein said third region has a thickness of at least 500 A.

5. A cathode element in accordance with claim 1 wherein said third region consists essentially of nickel.

References Cited by the Examiner

UNITED STATES PATENTS

| | | | |
|---|---|---|---|
| 2,619,706 | 12/52 | Vause | 29—25.14 |
| 2,663,069 | 12/53 | Espersen | 29—25.14 |
| 2,872,611 | 2/59 | Kerstetter | 313—337 |
| 3,005,926 | 10/61 | Horner | 313—337 |

JAMES D. KALLAM, *Acting Primary Examiner.*

RICHARD H. EANES, DAVID J. GALVIN,
*Examiners.*